US012777003B2

(12) United States Patent
Dallmann et al.

(10) Patent No.: US 12,777,003 B2
(45) Date of Patent: Oct. 27, 2026

(54) PROCESS CONTROL SYSTEM AND METHOD FOR FACILITATING OPERATIONS FOR USERS OF AN INDUSTRIAL AUTOMATION NETWORK

(71) Applicant: Siemens Aktiengesellschaft, Munich (DE)

(72) Inventors: Michael Dallmann, Wendelstein (DE); Kai Liu, Heroldsberg (DE); David Kollinger, Röthenbach a.d. Pegnitz (DE); Gerhard Langer, Erlangen (DE); Johannes Edenharter, Allersberg (DE); Miriam Esteve Velázquez, Feucht (DE)

(73) Assignee: Siemens Aktiengesellschaft

( * ) Notice: Subject to any disclaimer, the term of this patent is extended or adjusted under 35 U.S.C. 154(b) by 626 days.

(21) Appl. No.: 17/939,139

(22) Filed: Sep. 7, 2022

(65) Prior Publication Data

US 2023/0070441 A1 Mar. 9, 2023

(30) Foreign Application Priority Data

Sep. 8, 2021 (EP) .................................... 21195451

(51) Int. Cl.

*H04L 51/00* (2022.01)
*G05B 19/418* (2006.01)
*H04L 51/21* (2022.01)

(52) U.S. Cl.

CPC .......... *H04L 51/00* (2013.01); *G05B 19/4185* (2013.01); *H04L 51/21* (2022.05)

(58) Field of Classification Search

None

See application file for complete search history.

(56) References Cited

U.S. PATENT DOCUMENTS 7,437,441 B1 * 10/2008 Drew .................... H04L 41/082 709/248
2006/0034494 A1 * 2/2006 Holloran ............... H04L 9/3231 382/116

(Continued)

FOREIGN PATENT DOCUMENTS

CN 104320327 1/2015
CN 104575150 4/2015

(Continued)

OTHER PUBLICATIONS

EP Search Report dated Mar. 18, 2022 based on EP21195451 filed Sep. 8, 2021.

*Primary Examiner* — Lance Leonard Barry
(74) *Attorney, Agent, or Firm* — Cozen O'Connor

(57) ABSTRACT

System and method for facilitating operations for users of an industrial automation network with a plurality of automation devices, wherein work orders for the automation devices are managed in the automation network and are transmitted via a communications network, where a message service for exchanging messages between participants is operated with a list of participants that is prepopulated with virtual roles as participants such that the participants in the list of participants become variable participants, the users, the work orders or the automation devices are assigned to the virtual roles, and where a communications forum for exchanging messages between a virtual role of the work order and a first virtual role of a first user is created during determination of the work order.

17 Claims, 4 Drawing Sheets

(56) References Cited

U.S. PATENT DOCUMENTS

| | | | | |
|---|---|---|---|---|
| 2012/0089493 | A1* | 4/2012 | Podgurny | G06Q 40/12 705/342 |
| 2013/0275530 | A1* | 10/2013 | Matson | H04L 51/224 709/206 |
| 2016/0065490 | A1* | 3/2016 | Leff | H04L 47/78 709/226 |
| 2017/0054661 | A1* | 2/2017 | Golcher Barguil | H04L 51/046 |
| 2017/0093785 | A1 | 3/2017 | Kii | |
| 2017/0173888 | A1* | 6/2017 | Thomas-Lepore | H04L 51/52 |
| 2018/0248752 | A1 | 8/2018 | Hoeme et al. | |
| 2020/0368839 | A1* | 11/2020 | Falde | B23K 9/0956 |

FOREIGN PATENT DOCUMENTS

| | | | | | |
|---|---|---|---|---|---|
| CN | 113159510 | A | * | 7/2021 | |
| DE | 102018007943 | | | 4/2020 | |
| DE | 102018007943 | A1 | * | 4/2020 | |
| EP | 1850546 | A2 | * | 10/2007 | H04L 12/1831 |
| WO | WO-2010021927 | A2 | * | 2/2010 | G06Q 10/00 |
| WO | 2018206946 | | | 11/2018 | |
| WO | 2021113896 | | | 6/2021 | |

* cited by examiner

PROCESS CONTROL SYSTEM AND METHOD FOR FACILITATING OPERATIONS FOR USERS OF AN INDUSTRIAL AUTOMATION NETWORK

BACKGROUND OF THE INVENTION

1. Field of the Invention

The invention relates to a method for facilitating operations for users of an industrial automation network with a plurality of automation devices, wherein work orders for the automation devices are managed in the automation network and are transmitted via a communications network.

The invention also relates to a process control system for a user, configured to control and monitor an industrial automation network with a plurality of automation devices, having an order assignor configured to manage work orders for the automation devices and to transmit the work orders to the automation devices via a communications network.

2. Description of the Related Art

Different types of employees are used for the maintenance, upkeep and operation of industrial automation plants and automation networks, such as operators, operatives, planners, and/or application engineers, who require different types of information to perform their work. Examples of such information are questions concerning manufacturing orders or instructions for handling devices and automation components. In such cases, the different users require additional information or have to exchange information with one another in a short time.

Traditional systems for monitoring industrial plants and orders, such as SCADA and MES systems, provide information on actions or alarms, in order to tell the users about particular conditions. In the case of job orders or the assignment of work orders, comments are frequently used to tell the users about additional conditions. There are multiple disadvantages or restrictions with this type of communication method:

Alarm systems have been developed to monitor conditions (such as sensor threshold values) and to send advice to particular user roles. In the event of problems, it is not possible to pass on instructions by a user for devices or to ask other users questions to solve a problem. Notes of actions work in a similar way. They must likewise be predefined and do not permit any interactive communication.

Comments in job orders or work orders are read only at the start of a task. If requirements change in a consecutive sequence (e.g., changes to time windows) comment fields such as this are not suitable for passing this information on to the users. Furthermore, the operator has no opportunity to ask questions about work orders.

In accordance with the prior art, chat systems are known in the consumer field for communication between individuals. Unfortunately, in this type of chat system the communication cannot be transferred directly for industrial purposes, because chats are assigned to individuals. For industrial purposes, this principle must be modified, because people work in shifts and resources for orders or process steps of orders are assigned on demand. In addition, traditional chat systems must not be used within factories for safety reasons.

SUMMARY OF THE INVENTION

In view of the foregoing, it is therefore an object of the invention to modify known chat systems in such a manner and to upgrade them to meet the requirements of industrial plants.

This and other objects and advantages are achieved in accordance with the invention by a for facilitating operations for users of an industrial automation network with a plurality of automation devices, where work orders for the automation devices are managed in the automation network and are transmitted via a communications network, where a message service for exchanging messages between participants is operated with a list of participants, where the list of participants is prepopulated with virtual roles as participants such that the participants in the list of participants become variable participants, and where the users, the work orders or the automation devices are assigned to the virtual roles.

A selective exchange of messages between the users, the work orders and the automation devices about the virtual roles is now advantageously possible.

In an embodiment of the method, a first virtual role is assigned responsibility for the work orders and a first user is assigned the first virtual role, where a communications forum for the exchange of messages between the virtual role of the work order and the first virtual role of the first user is automatically created during the determination of a work order.

In accordance with the disclosed embodiments of the invention, a user role is defined for work orders and is responsible for managing such work orders, e.g., an application engineer is responsible for the work orders. During an order-based creation of communications forums or during order-based chats, such an application engineer could add information to an order at any time during the execution or prior to the execution, e.g., in the case of a print order for selective laser melting a specific substrate must be used and the order engineer could make this information known in a chat. An operator (or another user role) who is to execute this order or a particular step of this order is sent a notification about this chat. If a user needs additional information, then he or she can reply to this chat and ask questions. The responsible application engineer is sent the answer to the question and could also answer.

A further advantage of this implementation is that, in this case, different users may be involved. As a result of shift work, a second user could, at a later time, take over the role as application engineer by assignment of the virtual role.

Compared to conventional comments the assigned user is sent a message about the virtual role, drawing his or her attention to a particular point in the automation plant. Comments are normally read only at the start of a job order, but not subsequently. Another colleague who subsequently takes over the order is sent the same information, without messages having to be sent again in the event of a shift change, because by virtue of the renewed assignment of the virtual role the colleague has access to the chat for the virtual role.

With the inventive method and in particular the assignment of the virtual roles, direct communication between assets of a plant is possible. The disclosed embodiments of the invention advantageously go one step further compared to the conventional chat tools and enable automatic generation of a chat for an order including bidirectional linking of the participants, as soon as someone enters a comment/question, problem on this order. Here, the relevant virtual roles are automatically recorded as participants in this chat and a group of participants has been created.

Therefore, it is advantageous if in addition the virtual role of the automation device to which the work order was transmitted is included in the communications forum.

It is further advantageous if at the start of a shift the first user is assigned the first virtual role and at the end of a shift the first virtual role is withdrawn from the first user. As a result of shift schedules, a second user can now take over the role as an application engineer after the end of the first user's shift.

Depending on a shift schedule, the personnel or the users can be assigned the virtual roles and the virtual roles can additionally be assigned different rights and access rules with respect to manual intervention in the operation of the automation network.

With a view to a further improvement in the transmission of information, it is advantageous if in the event that an automation device participates in a communications forum, the respective communications forum is assigned to a display object for the automation device in the form of a chat window, where the display object is displayed on an operating screen of the automation network and thus, if needed, the chat window is superimposed in the vicinity of the display object.

Another increase in the display of information is achieved if process variables of the industrial automation network or of the respective automation device assigned to the display object are additionally superimposed in the chat window.

It is further advantageous if, based on the display object assigned to the automation device, a communications forum is created interactively on the operating screen for the virtual role assigned to the automation device.

For example, in the event of problems with an automation device, e.g., after printing with a 3D printer a spare part has to be replaced, a user can create a chat assigned to the automation device, namely the 3D printer. This chat is sent to all operators who are subsequently assigned to the same automation device, and likewise to the user role of this automation device. All virtual roles or users who are subsequently involved with the 3D printer can read this instruction. This is particularly advantageous because 3D print operations may extend over days or even weeks and thus a large number of different users are in charge of the printing.

With a view to efficient memory management, it is advantageous if the assignment of work orders to the virtual roles is deleted after a set time.

It is also advantageous if the assignment of work orders to the virtual roles and the communication log thereof are archived after a completion report for the respective work order and are then deleted.

It should be noted that the number of automation devices in an automation network does not significantly change, but the number of work orders increases. This means that the method must be able to add new virtual users as required. To minimize the list of participants for a system such as this, "old" virtual users or roles must be archived after a certain period of time, in the same way as order data. To this end, time stamps from the chat system could be used, e.g., all job orders that are older than 1 year could be archived. To optimize this process, an order assignor could provide a list of completed work orders. Based on this list, chats could be archived.

In accordance with the apparatus, the object referred to in the introduction could be achieved by a process control system for a user, configured to control and monitor an industrial automation network with a plurality of automation devices, having an order assignor configured to manage work orders for the automation devices and to transmit the work orders to the automation devices via a communications network, because a message service with a list of participants is present, which is configured to exchange messages between participants, a pre-populator is further present which is configured to pre-populate the list of participants with virtual roles as participants and thus to upgrade the participants in the list of participants to variable participants, and an assignor is further present that is configured to assign the users, the work orders or the automation devices to the virtual roles.

By introducing the virtual roles, it is now possible to enable a selective exchange of messages between the users, the work orders and the automation devices.

In a further embodiment, the process control system has a forum generator which, when a work order is transmitted, is configured to automatically create a communications forum for the exchange of messages between the virtual role of the work order and the virtual role of a user.

A further improvement in the forum generator for the process control system provides that the forum generator is configured such that the virtual role of the automation device to which the work order was transmitted is automatically included in the communications forum.

In particular for alternating operation or shift operation the process control system advantageously has a user manager which is configured to assign a first user a virtual role at the start of a shift and to withdraw the virtual role from the first user again at the end of a shift. Here, the user manager is configured, after the end of the first user's shift, to assign a second user this virtual role for the start of the second user's shift.

It is further advantageous if the process control system has a display device that displays an operating screen of the automation network with display objects for the automation devices, where to this end the operating screen is configured such that for the automation device that is participating in a communications forum the respective communications forum is displayed as a chat window with or in the vicinity of the display objects.

In the context of optimized memory management, the process control system has a memory manager that is configured to delete the assignment of work orders to the virtual roles after a set time and/or to archive the assignment of work orders to the virtual roles and the communications log thereof after a completion report for the respective work order and then to delete them.

In accordance with the disclosed embodiments of the invention, it is now possible, besides management of chat logs for individual roles, to additionally manage chat logs for work orders and machines. On assignment of a virtual role, for example, to a machine, the machine also has a suitable chat profile in the list of participants. In the machine's associated chat, further information can now be stored and made available selectively to groups of employees.

The networked machines or the networked automation devices can also create messages. Examples of these include fault messages, and/or notes on pending maintenance. All this appears in a communications forum as messages.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which.

DETAILED DESCRIPTION OF THE EXEMPLARY EMBODIMENTS

Figure 1:
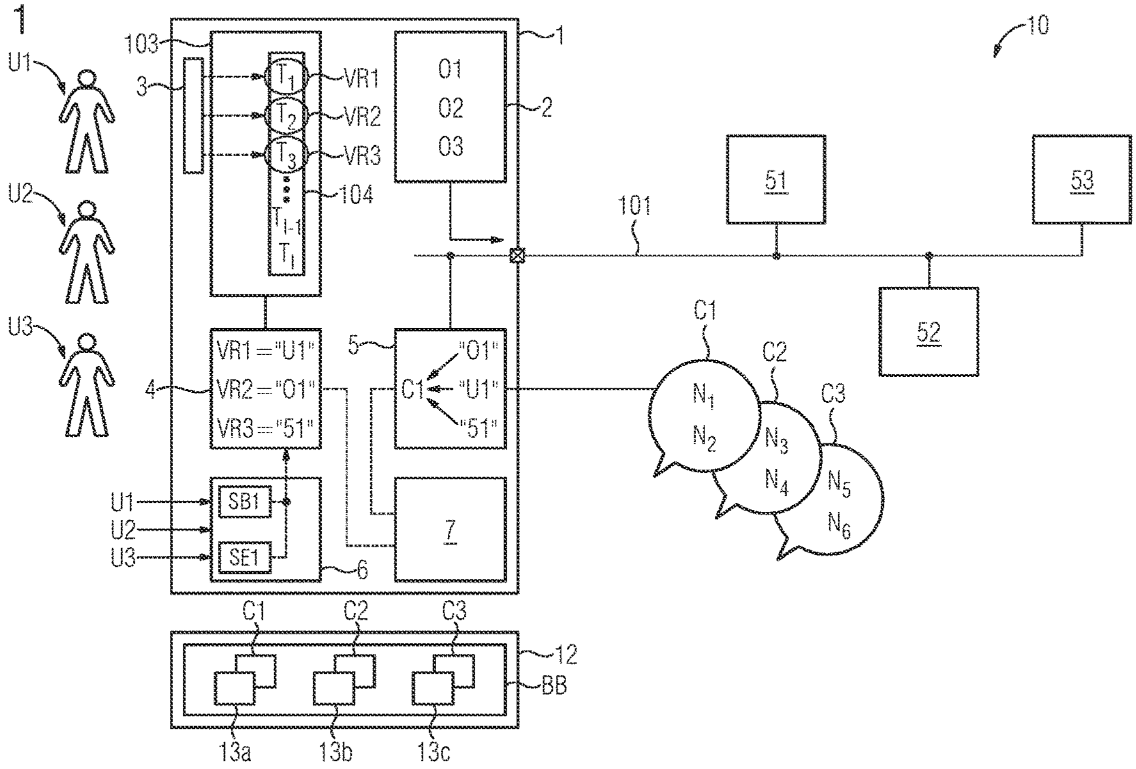
FIG. 1 shows a process control system connected to an automation network in accordance with the invention.

FIG. 1 shows a process control system 1 for a first user U1, a second user U2 and a third user U3, where the users U1,U2,U3 in part operate the process control system 1 in shift operation with one another. The process control system 1 is configured to control and/or monitor an industrial automation network 10 with a plurality of automation devices 51,52,53, where a first automation device 51, a second automation device 52 and a third automation device 53 are connected to one another via a communications network 101. The process control system 1 has an order assignor 2 that is configured to manage work orders O1,O2, O3 for the automation devices 51,52,53 and to transmit the work orders O1,O2,O3 to the automation devices 51,52,53 via the communications network 101.

To enable a selective exchange of messages $N_i$ between the users U1,U2,U3, the work orders O1,O2,O3 and the automation devices 51,52,53, a message service 103 with a list of participants 104 is present, which is configured to exchange messages $N_i$ between participants $T_e$. A pre-populator 3 is configured to pre-populate the list of participants 104 with virtual roles VR1,VR2,VR3 as participants $T_e$ and thus to upgrade the participants $T_e$ in the list of participants 104 to variable participants. An assignor 4 is configured to assign the users U1,U2,U3, the work orders O1,O2,O3 or the automation devices 51,52,53 to the virtual roles VR1,VR2, VR3.

Via a user manager 6, the first user U1, who is responsible for the work orders, is assigned the first virtual role VR1 at the start of a shift SB1 with the assistance of the assignor 4. Thus, the first virtual role VR1 has been sent responsibility for the work orders O1,O2,O3 via the first user U1. If, for example, a first work order O1 is now dispatched, a first communications forum C1 is created for the first work order O1 and the first user U1 or the assigned first virtual role VR1 via a forum generator 5 with the knowledge that the first virtual role VR 1 is responsible for the work orders. Further, in addition a third virtual role VR3 for the automation device 51,52,53 to which the first work order O1 was transmitted is included in the first communications forum C1. Messages $N_1, N_2, \ldots, N_5, N_6$ can now be exchanged in the communications forums C1,C2,C3 created in this way or in the chat groups created in this way.

The user manager 6 is further configured to assign a first user U1 the virtual role VR1 at the start of a shift SB1 and to re-withdraw the virtual role VR1 from the first user U1 at the end of a shift SE1. At the end of the shift SE1 of the first user U1, the responsibility could now be transferred, e.g., to a second user U2 by assigning the first virtual role VR1 and by withdrawing the first virtual role VR1 from the second user U2 again after the end of the second user's shift.

If an automation device 51,52,53 is participating in a communications forum C1,C2,C3, then the respective communications forum C1,C2,C3 is assigned to a display object 13*a*,13*b*,13*c* for the respective automation device 51,52,53 as a chat window W1,W2,W3. The display object 13*a*,13*b*, 13*c* is displayed within a display device 12 on an operating screen BB and thus if need be the chat window W1,W2,W3 is superimposed in the vicinity of the associated display object 13*a*,13*b*,13*c*.

With the help of a memory manager 7 the assignments of work orders O1,O2,O3 to the virtual roles VR1,VR2,VR3 are deleted after a set time and/or the assignment of the work orders O1,O2,O3 to the virtual roles VR1,VR2,VR3 and the communications log thereof are archived after a completion report for the respective work order O1,O2,O3 and then deleted.

Figure 2:
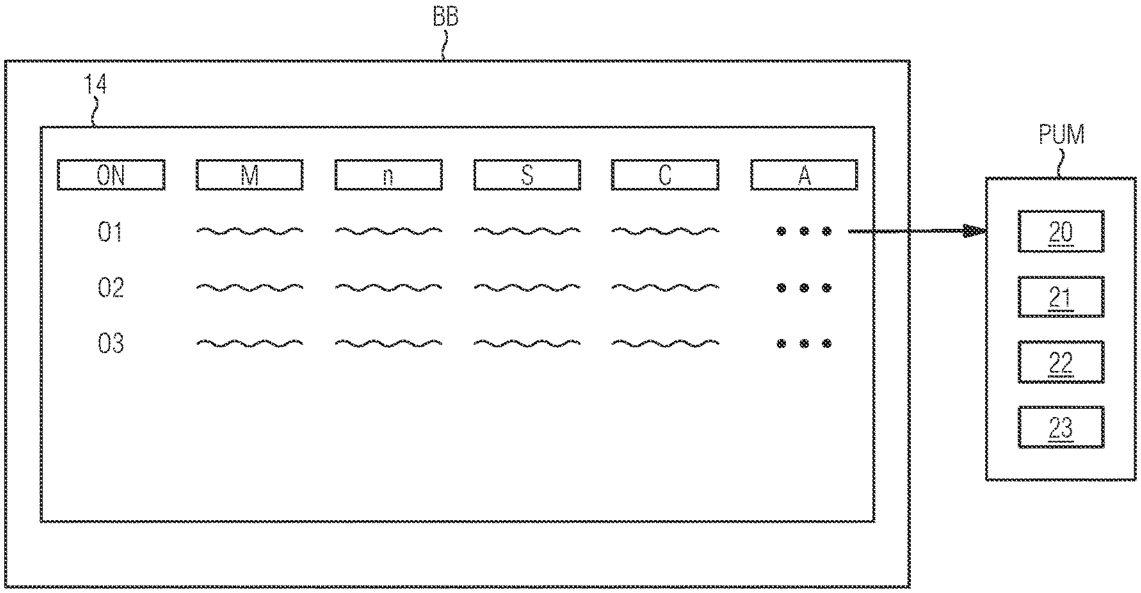
FIG. 2 shows an order list superimposed in an operating screen in accordance with the invention.

FIG. 2 shows an order list 14, which can likewise be displayed in an operating screen BB. Arranged in the top row of the order list 14 are, in sequence, an order name ON, a material composition M, a quantity n, a specification S, an indication of the number of the associated chat entries C and an action A. The column for the order names ON contains the first work order O1, the second work order O2 and the third work order O3. In the column for the action A, a push-up menu PUM can, for example, be selected via three points. Interactive buttons are displayed in this push-up menu PUM. Clicking on a first button 20 enables a communications forum to be generated, clicking on a second button 21 enables existing chats to be retrieved, clicking on a third button 22 enables the respective order to be processed and clicking on a fourth button 23 enables the respective order to be deleted.

The push-up menu PUM and the order list 14 with the superimposed action A column can now be used to assign the work orders O1,O2,O3 already dispatched another chat message or even to generate a chat in the form of a communications forum.

Figure 3:
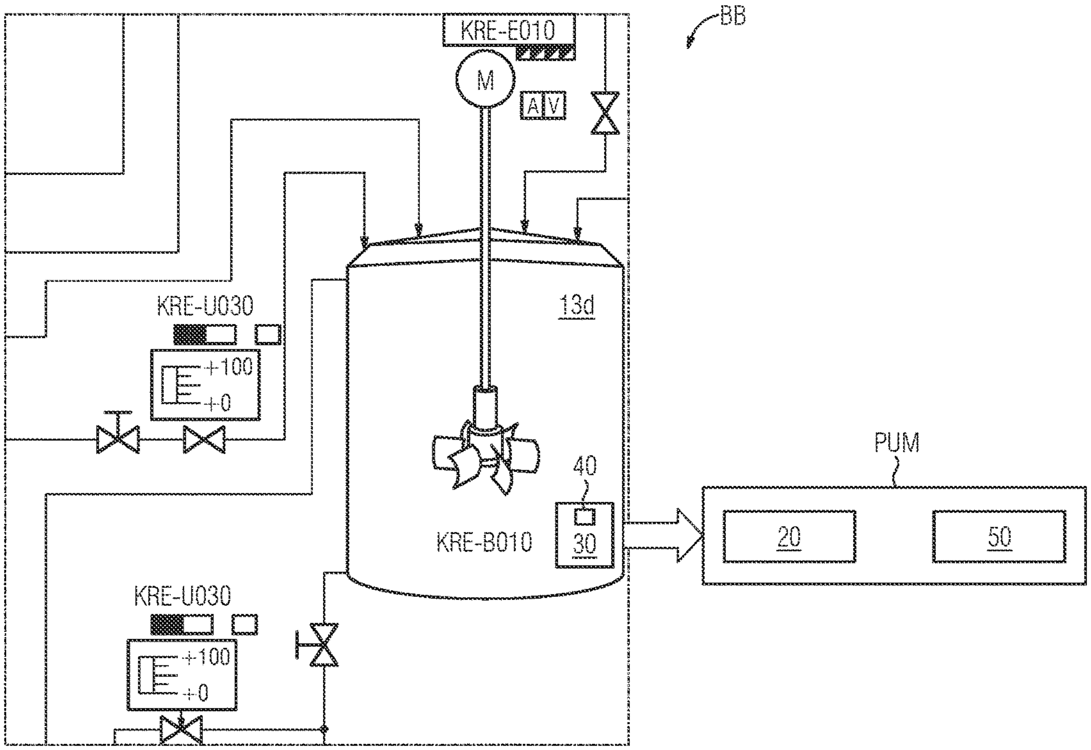
FIG. 3 shows an operating screen with a display object for generating a push-up menu in accordance with the invention.

As shown in FIG. 3, an advantageous configuration of a fourth display object 13*d* is displayed within an operating screen BB. Thus, for example, in the operating screen BB the fourth display object 13*d* can be assigned a boiler with an agitator. In the event of problems, an operator responsible for this agitator can once again generate a push-up menu PUM via a further action button 30, which advantageously contains a display 40 in which the number of the assigned chat entries is displayed, and in the push-up menu the operator can click on the button 20 "Generate chat" and thus generate a message to the participants linked to the chat. Alternatively, in the push-up menu PUM said operator can click on a further button 50 and obtain an overview of the existing chat entries.

Figure 4:
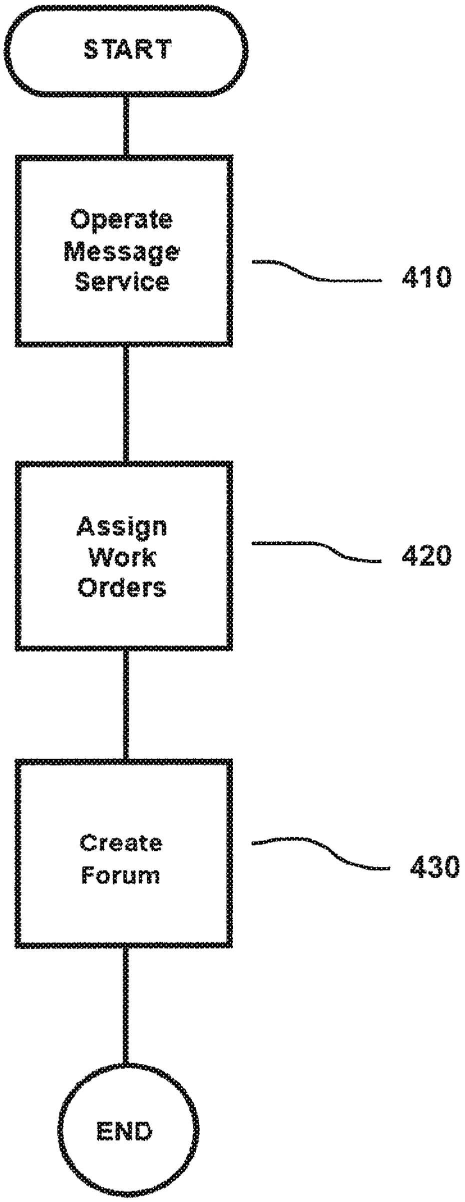
FIG. 4 is a flowchart of the method in accordance with the invention.

FIG. 4 is a flowchart of the method for facilitating operations for users U1,U2,U3 of an industrial automation network 10 with a plurality of automation devices 51,52,53, where work orders O1,O2,O3 for the automation devices 51,52,53 are managed in the automation network 10 and are transmitted via a communications network 101.

The method comprises operating a message service 103 to exchange messages $N_i$ between participants $T_e$ with a list of participants 104, as indicated in step 410. In accordance with the method of the invention, the list of participants 104 is prepopulated with virtual roles VR1,VR2,VR3 as participants $T_e$ such that the participants $T_e$ in the list of participants 104 become variable participants $T_e$.

Next, one of the users U1,U2,U3, the work orders O1,O2, O3 or the automation devices 51,52,53 is assigned to the virtual roles VR1,VR2,VR3, as indicated in step 420.

Next, a communications forum for exchanging messages between a virtual role of the work order and a first virtual role of a first user is created during determination of the work order, as indicated in step 430.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for facilitating operations for users of an industrial automation network with a plurality of automation devices, work orders for the automation devices being managed in the automation network and being transmitted via a communications network, the method comprising:

operating a message service with a list of participants to exchange messages between participants, the list of participants being prepopulated by a pre-populator with virtual roles as participants of the message exchange such that the participants in the list of participants become upgraded to variable participants, the virtual roles being re-assignable to subsequent users which access messages previously exchanged between the participants of the message exchange;

assigning one of the users, the work orders and the automation devices to the virtual roles; and creating during determination of the work order a communications forum for exchanging messages between a virtual role of the work order and a first virtual role of a first user;

wherein the communications forum is automatically created for exchange of the messages between the virtual role of the work order and the first virtual role of the first user when the work order is transmitted; and wherein a virtual role of the automation device to which the work order was transmitted is additionally included in the communications forum.

2. The method as claimed in claim 1, wherein the first virtual role is assigned responsibility for the work orders and the first user is assigned the first virtual role.

3. The method as claimed in claim 1, wherein the first user is assigned the first virtual role at a start of a shift and the first virtual role is withdrawn from the first user at an end of the shift.

4. The method as claimed in claim 2, wherein the first user is assigned the first virtual role at a start of a shift and the first virtual role is withdrawn from the first user at an end of the shift.

5. The method as claimed in claim 1, wherein the first user is assigned the first virtual role at a start of a shift and the first virtual role is withdrawn from the first user at an end of the shift.

6. The method as claimed in claim 2, wherein the communications forum is assigned to a display object for the automation device as a chat window when an automation device is participating in the communications forum; and wherein the display object is displayed on an operating screen of the automation network such that the chat window is superimposed in a vicinity of the display object when needed.

7. The method as claimed in claim 1, wherein the communications forum is assigned to a display object for the automation device as a chat window when an automation device is participating in the communications forum; and wherein the display object is displayed on an operating screen of the automation network such that the chat window is superimposed in a vicinity of the display object when needed.

8. The method as claimed in claim 3, wherein the communications forum is assigned to a display object for the automation device as a chat window when an automation device is participating in the communications forum; and wherein the display object is displayed on an operating screen of the automation network such that the chat window is superimposed in a vicinity of the display object when needed.

9. The method as claimed in claim 4, wherein process variables of the industrial automation network or of the automation device assigned to the display object are additionally superimposed in the chat window.

10. The method as claimed in claim 4, wherein a communications forum for the virtual roles assigned to the automation device is created interactively on the operating screen based on the display object assigned to the automation device.

11. The method as claimed in claim 5, wherein a communications forum for the virtual roles assigned to the automation device is created interactively on the operating screen based on the display object assigned to the automation device.

12. The method as claimed in claim 1, wherein the assignment of work orders to the virtual roles is deleted after a set time.

13. The method as claimed in claim 1, wherein the assignment of work orders to the virtual roles and the communications log thereof is archived after a completion report for the work order and is then deleted.

14. A process control system for a user configured to control and monitor an industrial automation network with a plurality of automation devices, the process control system comprising:

a processor and memory;

an order assignor configured to manage work orders for the automation devices and to transmit the work orders to the automation devices via a communications network;

a message service with a list of participants, the message service being configured to exchange messages between participants;

a pre-populator configured to pre-populate the list of participants with virtual roles as participants of the message exchange such that the participants in the list of participants become upgraded to variable participants, the virtual roles being re-assignable to subsequent users which access messages previously exchanged between the participants of the message exchange;

an assignor configured to assign one of the users, the work orders and the automation devices to the virtual roles; and a forum generator which is configured to automatically create a communications forum for the exchange of messages between a virtual role of the work order and a virtual role of the user when the work order is transmitted;

wherein the communications forum for exchanging messages between the virtual role of the work order and a first virtual role of a first user is created during determination of the work order; and wherein the forum generator is further configured to include a virtual role of the automation device to which the work order was transmitted in the communications forum.

15. The process control system as claimed in claim 14, further comprising:

a user manager which is configured to assign a user a virtual role at the start of the shift and to re-withdraw the virtual role from the user at the end of the shift.

16. The process control system as claimed in claim 14, further comprising:

a display device that displays an operating screen of the automation network with display objects for the automation devices;

wherein the operating screen is configured to display the communications forum as a chat window with or in a vicinity of the display objects for the automation device that is participating in a communications forum.

17. The process control system as claimed in claim 14, further comprising:

a memory manager configured to at least one of (i) delete the assignment of work orders to the virtual roles after a set time and (ii) archive the assignment of work orders to the virtual roles and the communication log thereof after a completion report for the respective work order and then to delete them.

* * * * *